US006956871B2

(12) United States Patent
Wang et al.

(10) Patent No.: US 6,956,871 B2
(45) Date of Patent: Oct. 18, 2005

(54) APPARATUS AND METHOD FOR SYNCHRONIZATION OF AUDIO AND VIDEO STREAMS

(75) Inventors: Charles Chuanming Wang, Jamison, PA (US); Andreas Matthais Aust, Princeton, NJ (US); Sachin Satish Mody, Lawrenceville, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 102 days.

(21) Appl. No.: 10/340,477

(22) Filed: Jan. 10, 2003

(65) Prior Publication Data

US 2003/0198256 A1 Oct. 23, 2003

Related U.S. Application Data

(60) Provisional application No. 60/374,269, filed on Apr. 19, 2002.

(51) Int. Cl.$^7$ ................................................. H04J 3/06
(52) U.S. Cl. ...................................... 370/503; 348/515
(58) Field of Search ........................... 370/503, 516, 370/517, 519; 348/500, 512, 513, 515, 518, 423.1, 462, 464, 521

(56) References Cited

U.S. PATENT DOCUMENTS

| | | | | |
|---|---|---|---|---|
| 5,565,924 A | * | 10/1996 | Haskell et al. | 348/423.1 |
| 5,570,372 A | | 10/1996 | Shaffer | 370/108 |
| 5,588,029 A | | 12/1996 | Maturi et al. | 375/364 |
| 5,617,502 A | | 4/1997 | Ort et al. | 386/97 |
| 5,623,483 A | * | 4/1997 | Agrawal et al. | 370/253 |
| 5,703,877 A | | 12/1997 | Nuber et al. | 370/395 |
| 5,818,514 A | | 10/1998 | Duttweiler et al. | 348/15 |
| 5,901,335 A | | 5/1999 | Kim | 395/898 |
| 5,949,410 A | | 9/1999 | Fung | 345/302 |
| 5,960,006 A | | 9/1999 | Maturi et al. | 370/509 |
| 6,115,422 A | | 9/2000 | Anderson et al. | 375/240 |
| 6,151,443 A | | 11/2000 | Gable et al. | 386/109 |
| 6,169,843 B1 | | 1/2001 | Lenihan et al. | 386/46 |
| 6,230,141 B1 | | 5/2001 | Böhm et al. | 704/503 |
| 6,285,405 B1 | * | 9/2001 | Binford et al. | 348/512 |
| 6,356,312 B1 | | 3/2002 | Lyu | 348/512 |
| 6,363,429 B1 | | 3/2002 | Ketcham | 709/235 |
| 6,744,473 B2 | * | 6/2004 | Wells | 348/515 |
| 2002/0103919 A1 | * | 8/2002 | Hannaway | 709/231 |

OTHER PUBLICATIONS

Rousseau, F. et al., "Playing Temporal HTML Documents", Proceedings of ACM Multimedia '98, Bristol, UK, Sep. 12–16, 1998.

Eleftheriadis, A. et al., "Lot Bit Rate Model–Assisted H.261–Compatible Coding Of Video", Proceedings, 2nd IEEE International Conference On Image Processing (ICIP–95), Arlington, Virginia, Oct. 1995.

"New Audio To Video Synchronization Methods Tutorial", Article found at: http://www.pixelinstruments.com/5ProfesArticles/1/ProArticles.htm; Oct. 4, 2001.

Qu, G. et al., "System Synthesis of Synchronous Multimedia Applications", Article found at: http://citeseer.ni.nec.com/cache/papers/cs/15081/http:zSzzSzwww.cs.ucla.eduSzgangquzSzpublicationzSzqu.pdf/system–synthesis–of–synchronous.pdf, Apr. 19, 2002.

(Continued)

*Primary Examiner*—Man U. Phan
*Assistant Examiner*—Toan Nguyen
(74) *Attorney, Agent, or Firm*—Joseph S. Tripoli; Ronald H. Kurdyla; Guy H. Eriksen

(57) ABSTRACT

Disclosed is a method and apparatus for reducing the audio-visual synchronization problems (e.g.—"lip sync" problems) in corresponding audio and video streams by adapting a statistical distribution of temporal errors to create a new statistical distribution of temporal errors. The new statistical distribution of temporal errors being substantially within an acceptable synchronization tolerance window which is less offensive to a viewer/listener.

18 Claims, 4 Drawing Sheets

OTHER PUBLICATIONS

Qiao, L. et al., "Lip Synchronization Within An Adaptive VOD System", Article found at: http://citeseer.ni.nec.com/cache/papers/cs/1080/ftp:zSzzSza.cs.uiuc.eduzSzpubzSzfacultyzSzklarazSzSyncPaper.pdf/qiao97lip.pdf, Apr. 19, 2002.

Mathur, A. G. et al., "Protocol Composition–Based Approach To Qos Control In Collaboration Systems", Article found at: http//citeseer.nj.nec.com/cache/papers/cs/1484/http: zSzzSzftp.sunet.sezSzpubzSzgroupwarezSzDistEditzSzpaperszSzicmcs96.pdf/mathur95protocol.pdf, Apr. 19, 2002.

* cited by examiner

PROBABILITY OF DENSITY FUNCTION
p(e) OF THE LIP SYNCH ERROR e.

LIP SYNCH ERROR TOLERANCE (LSET) WINDOW.

700

800

APPARATUS AND METHOD FOR SYNCHRONIZATION OF AUDIO AND VIDEO STREAMS

CROSS-REFERENCE TO RELATED APPLICATIONS

This patent application claims the benefit of U.S. Provisional Application Ser. No. 60/374,269, filed Apr. 19, 2002, which is incorporated herein by reference in its entirety.

BACKGROUND OF THE INVENTION

1. Field of the Invention

The invention relates to the field of multimedia communication systems and, more specifically, to the minimization of lip sync errors induced by variable delay transport networks.

2. Background of the Invention

The problem of "lip synchronization" or lip sync is well known. Briefly, temporal errors in the presentation of audio and video streams by a presentation device may result in a condition whereby audio information is presented before (leading) or after (lagging) corresponding video information, resulting in, for example, poor synchronization between the audio representation of a speaker's voice and the video representation of the speaker's lips.

Prior art techniques to solve the so-called lip sync problem are relatively complex, and sometimes cause degradation in the audio and/or video information. For example, it is known to drop video frames such that a temporal advance of video imagery is induced to thereby correct for a leading audio signal.

Lip sync errors may be caused by many sources. Of particular concern is the use of variable delay networks such as the Internet and other packet switching networks. In such networks, audio and video information is transported as separate and independent streams. During transport processing prior to the introduction of these streams to the variable delay network, a transport layer header containing a timestamp as well as other metadata (e.g., encoder sampling rate, packet order and the like) is added to some or all of the transport packets. The timestamps for the audio and video information are typically derived from a common source, such as a real-time clock. Unfortunately, as the audio and video packets traverse the variable delay network, temporal anomalies are imparted, packets are dropped, order of the packets is not preserved and packet delay time is varied due to network conditions. The net result is lip sync error within received audio and video streams that are passed through the variable delay network.

SUMMARY OF INVENTION

The invention comprises a method and apparatus for reducing the lip sync problems in corresponding audio and video streams by adapting a statistical distribution of temporal errors into a range of error deemed less offensive or noticeable to a listener.

Specifically, a method according to an embodiment of the invention comprises: receiving video access units and corresponding audio access units, the video and corresponding audio access units representing audiovisual information tending to exhibit a lip sync error described by a first probability distribution function (pdf); and temporally delaying one of the received audio and video access units by a timing factor, non-delayed and corresponding delayed access units representing audiovisual information tending to exhibit a lip sync error described by a second pdf, the second pdf utilizing a greater portion of a lip sync tolerance window than the first pdf.

In another embodiment, a method for producing encoded video and audio streams adapted for use in a variable delay network comprises encoding temporally corresponding video and audio information to produce encoded video and audio streams, each of the encoded video and audio streams comprising a plurality of respective video and audio packets including timestamped video and audio packets; and adapting at least one of the video timestamped packets and the audio timestamped packets by a timing factor to reduce the likelihood of a lagging video lip sync error.

In another embodiment, a lip sync error pdf estimator is implemented at a receiver to dynamically estimate the pdf. Based on the estimated pdf, an optimal audio delay time is calculated in terms of objective function. The calculated delay then is introduced at the receiver side.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, whenever possible, to designate identical elements that are common to the figures.

DETAILED DESCRIPTION OF THE INVENTION

The invention will be discussed within the context of a variable delay network such as the Internet, wherein the variable delay network tends to impart temporal errors in video and/or audio packets passing through such that lip sync errors may result. However, the methodology of the present invention can be readily adapted to any source of temporal errors. The invention operates on video and/or audio presentation units such as video and audio frames, which presentation units may be packetized for suitable transport via a network such as a variable delay network.

Furthermore, although a standard communications definition of "lip sync" relates the synchronization (or process of synchronization) of speech or singing to the video, so that video lip movements appear to coincide naturally with the sound; for purposes of the present invention, the definition is not to be construed as being so limited. Rather, "lip sync" refers to the synchronization of any action represented in video corresponding to an audio track or bitstream, such that the sound purportedly generated by the action is matched appropriately with the video purportedly producing that sound. In other words, "lip sync", for the purposes of the present invention, refers to synchronization between sounds represented by an audio information signal and corresponding video represented by a video information signal; regardless of the corresponding audio and video subject matter. Therefore, reference to a "lip sync error" is general in nature and is construed as any type of "audio-visual temporal synchronization error."

Figure 1:
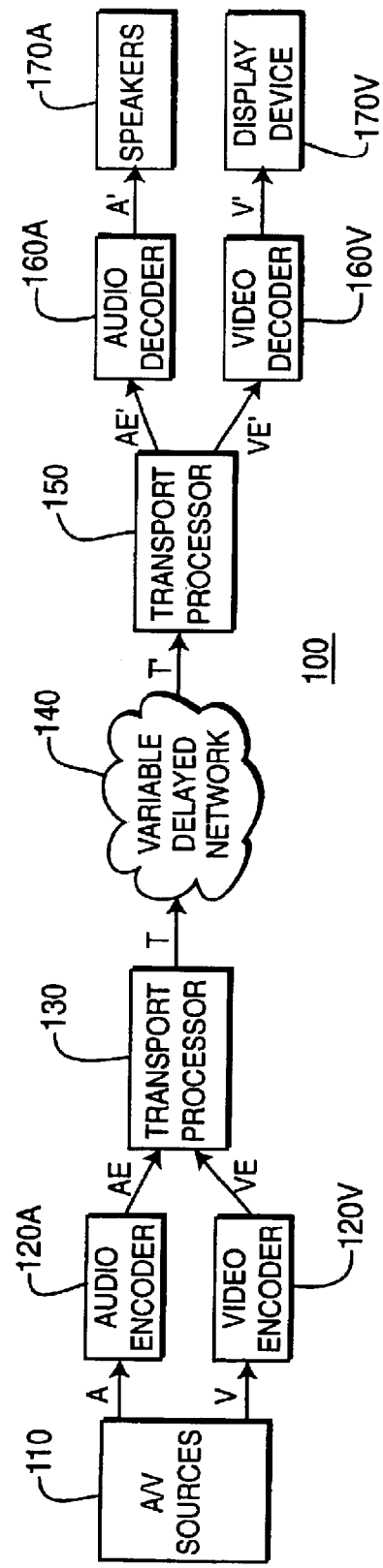
FIG. 1 depicts a high-level block diagram of a communications system.

FIG. 1 depicts a high-level block diagram of a communications system including the present invention. Specifically, the communications system 100 comprises an audiovisual source 110, such as a mass storage device, camera, microphone, network feed or other source of audio-visual information. The audiovisual source 110 provides a video stream V to a video encoder 120V and a corresponding audio stream A to an audio encoder 120A, respectively. The encoders 120V AND 120A, illustratively forming an MPEG or other compression encoders, encode the video stream V and audio stream A to produce, respectively, encoded video stream VE and encoded audio stream AE. The encoded video VE and audio AE streams are processed by a transport processor 130 in accordance with the particular transport format appropriate to the variable delayed network 140, illustratively an Ethernet, ATM or other transport stream encoder, which encodes the video VE and audio AE streams in accordance with the particular transport format appropriate to the variable delay network 140.

The transport stream T is propagated by a variable delay network 140, such as the Internet, intranet, ATM, Ethernet, LAN, WAN, public switched telephone network (PSTN), satellite, or other network; to a destination where it is received as transport stream T'. Transport stream T' comprises the original transport stream T including any delay or other errors introduced by conveyance over the variable delay network 140.

The resultant transport stream T' is received by a transport processor 150, illustratively an Ethernet, ATM or other transport stream decoder, which extracts from the received transport stream T' an encoded video stream VE' and a corresponding encoded audio stream AE'. The encoded video VE' and audio AE' streams comprise the initial encoded video VE and audio AE streams including any errors such as temporal errors induced by the transport processor 130, variable delay network 140 and/or transport processor 150. The received encoded video VE' and audio AE' streams are decoded by a decoder 160 to produce resulting video V' and audio A' streams. The resulting video V' and audio A' streams are presented by a presentation device 170, such as a television or other display device, 170V having associated with it audio presentation means such as speakers 170A.

Figure 2:
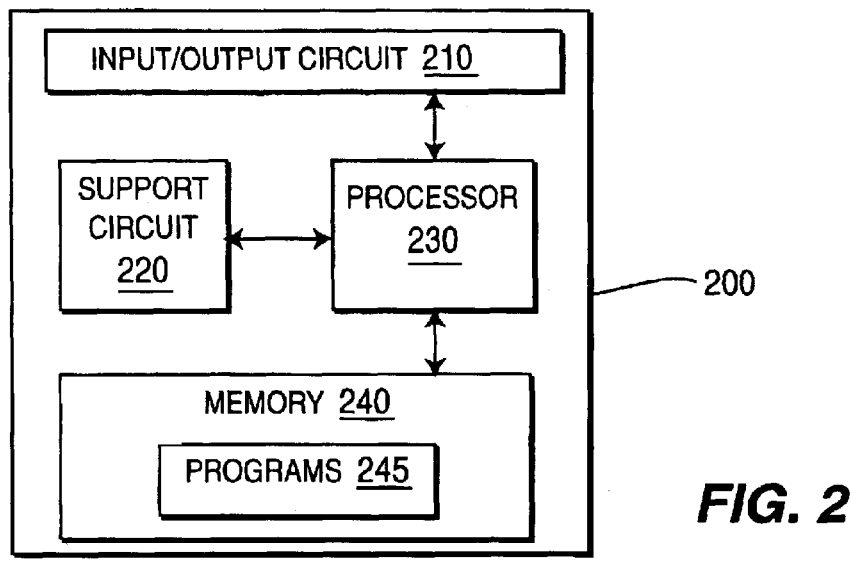
FIG. 2 depicts a high-level block diagram of a controller.

FIG. 2 depicts a block diagram of a controller suitable for use in the systems and apparatus, in accordance with the principles of the present invention. Specifically, the controller 200 of FIG. 2 may be used to implement one or more of the functional elements described above with respect to FIG. 1, as well as the various functional elements described below with respect to FIGS. 7 and 8.

The exemplary controller 200 of FIG. 2 comprises a processor 230 as well as memory 240 for storing various programs 245. The processor 230 cooperates with conventional support circuitry 220 such as power supplies, clock circuits, cache memory and the like as well as circuits that assist in executing the software routine stored in the memory 240. As such, it is contemplated that some of the process steps discussed herein as software processes may be implemented within hardware, for example, as circuitry that cooperates with the processor 230 to perform various steps. The controller 200 also contains input/output (I/O) circuitry 210 that forms an interface between the various functional elements communicating with a functional element including the controller 200.

Although the controller 200 of FIG. 2 is depicted as a general-purpose computer that is programmed to perform various temporal modifications of audio and/or video streams in accordance with the present invention, the invention can be implemented in hardware as, for example, an application specific integrated circuit (ASIC). As such, the process steps described herein are intended to be broadly interpreted as being equivalently performed by software, hardware, or a combination thereof.

Lip Synch Error (LSE) can be defined according to equation 1, as follows:

$$e=(t_d^a-t_d^v)-(t_e^a-t_e^v) \qquad (\text{eq. 1})$$

In equation 1, $t_d^a$ and $t_d^v$ are the time of the related audio and video frames arriving at the presentation device 170 at the receiver side, respectively; and $t_e^a$ and $t_e^v$ are the time of the audio and video frames arriving at the audio and video encoders, respectively.

Figure 3:
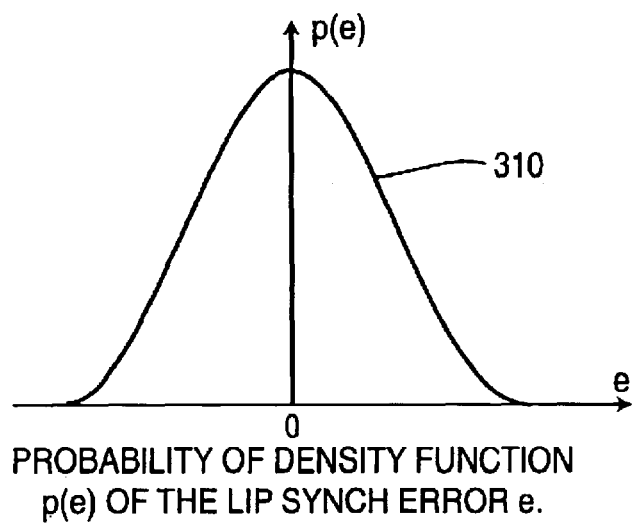
FIG. 3 depicts a graphical representation of a probability density function p(e) of a lip sync error e useful in understanding the present invention.

FIG. 3 depicts a graphical representation of a probability density function p(e) of a lip sync error e useful in understanding the present invention. Due to the random delay introduced, for example, by the variable delay network 140, the delay between an audio packet and its corresponding video packet at the receiver side is a random variable. This random variable is confined by its probability density function (pdf), p(e), as the solid line 310 of FIG. 3. Specifically, the graphical representation of FIG. 3 depicts a horizontal axis defining a temporal relationship between video data and corresponding audio data. A time zero is selected to represent a time at which the video data represents content having associated with it synchronized audio data. While this distribution is depicted as a Gaussian distribution, other symmetric or asymmetric pdf curves may be utilized, depending upon the particular error source modeled, as well as the number of error sources modeled (i.e., a compound symmetric or asymmetric pdf curve for multiple video and audio sources may be used).

As time increases from zero in the positive direction, the audio data is said to increasingly lag the video data (i.e., audio packets are increasingly delayed with respect to corresponding video packets). As time increases in the negative direction with respect to zero, audio data is said to increasingly lead the video data (i.e., video packets are increasingly delayed with respect to corresponding audio packets).

Figure 4:
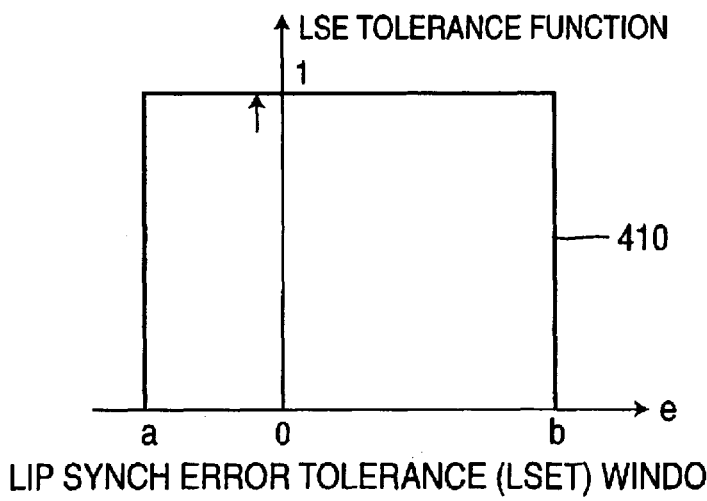
FIG. 4 depicts a graphical representation of a lip synch error tolerance (LSET) window useful in understanding the present invention.

FIG. 4 depicts a graphical representation of a lip sync error tolerance (LSET) window 410 useful in understanding the present invention. Specifically, the LSET window is defined by the function of equation (2), as follows, where a and b are lower and upper limits of the tolerance of the LSET window.

$$W(e) = \begin{cases} 1 & (a \le e \le b) \\ 0 & \text{(othewise)} \end{cases} \quad \text{(eq. 2)}$$

The inventors note that the asymmetric error tolerances for audio and video packets and numerous problems arising from cases when an audio packet is received before the corresponding video packet. The typical range of the values varies, for example, [a, b]=[−20 ms, 40 ms].

Figure 5:
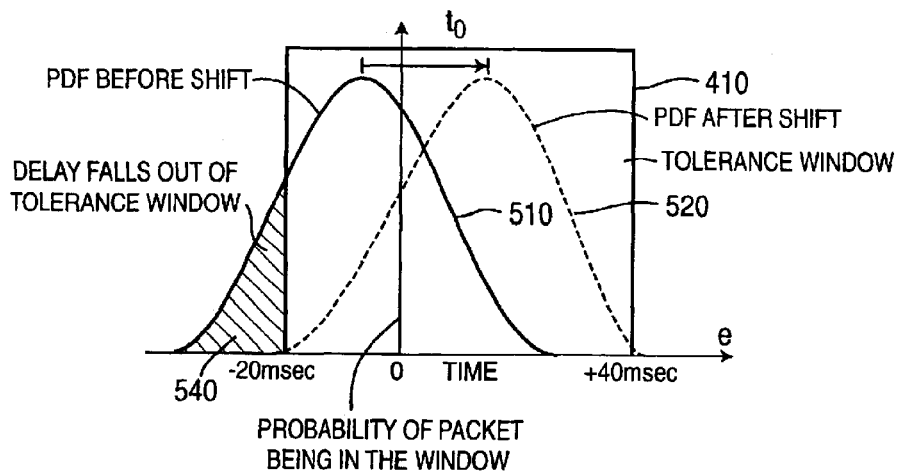
FIG. 5 depicts a graphical representation of a pdf shift within a tolerance window.

FIG. 5 depicts a graphical representation of a pdf shift within a tolerance window. Specifically, the graphical representation of FIG. 5 depicts a horizontal axis defining a temporal relationship between video data and corresponding audio data. A time zero is selected in the manner described above with respect to FIGS. 3 and 4. The delay tolerance window 410 represents the delay tolerance or temporal errors associated with lip sync that will not be found objectionable to a viewer. It is noted that the delay tolerance window 410 of FIG. 5 extends from −20 milliseconds (i.e., audio packets leading video packets by up to 20 milliseconds) up to +40 milliseconds (i.e., audio packets lagging video packets by up to 40 milliseconds). It is noted that lip sync errors where audio information leads video information tend to be more objectionable (e.g.—more noticeable and/or distracting to a viewer) than those where audio information lags video information, thus the asymmetry in the delay tolerance window 410 of FIG. 5.

Referring to FIG. 5, the left "tail" portion of a pdf curve 510 falls into a region 540 beyond a lower delay tolerance window range. It is noted that the right "tail" portion of the pdf curve 510 is substantially zero well prior to the upper end of the delay window tolerance range. The error window tolerance range is defined as the range in which temporal errors such as lip sync errors are deemed less offensive. Thus, delays exceeding, either positively or negatively, the delay tolerance range (i.e., delays outside of a error tolerance window) comprise those delays that are deemed objectionable or highly objectionable to the average viewer.

A shifted pdf curve 520 represents the initial probability distribution curve 510 shifted in time such that a larger area underneath the pdf curve is within the error tolerance window 410. Thus, the initial or first pdf has been shifted in time such that an increased area (preferably a maximum area) under the final or second pdf is included within the error tolerance window 410. This shift in pdf is caused by adapting timing parameter(s) associated with video and/or audio information, such as presentation timestamps of video and/or audio access units. Thus, if audio and/or video temporal information is adapted to effect such a shift in the corresponding pdf, then the likelihood of objectionable lip sync errors is minimized or at least reduced by an amount commensurate with the reduction in pdf under curve error caused by the shift. Therefore, the optimal solution for maximization the area under the LSE curve within the LSET is to maximize the objective function given as equation 3, as follows:

$$J = \int_{-\infty}^{+\infty} p(e - t_0) W(e) de \quad \text{(eq. 3)}$$
$$= \int_a^b p(e - t_0) de$$
$$= P(b - t_0) - P(a - t_0)$$

In equation 3, P(e) is the pdf of the LSE, P(e) is the cumulative distribution function and W(e) is the LSET window function defined in [2], respectively. The process of the optimization is to maximize the area enclosed by the pdf curve bounded by [a, b]. This is equivalent to the process of minimization of the "tail" area outsides of the window. This optimization problem can be solved by taking the derivative of J with respect to $t_0$ and solve equation 4 for $t_0$, as follows:

$$\frac{dJ}{dt_0} = 0 \quad \text{(eq. 4)}$$

It can be proved that the optimal solution of $t_0$ for a symmetric Gaussian LSE pdf as shown in FIG. 2 is the average of the lower and upper limits of the LSET window:

$$t_0 = \frac{a+b}{2} \quad \text{(eq. 5)}$$

For other LSE pdf, the optimal $t_0$ may have a positive or negative value, depending on the relative geographical locations between the pdf and the error tolerance window. A positive $t_0$ means delays in audio frames and negative $t_0$ delays in video frames to shift the LSE and to maximize equation 4.

Figure 6:
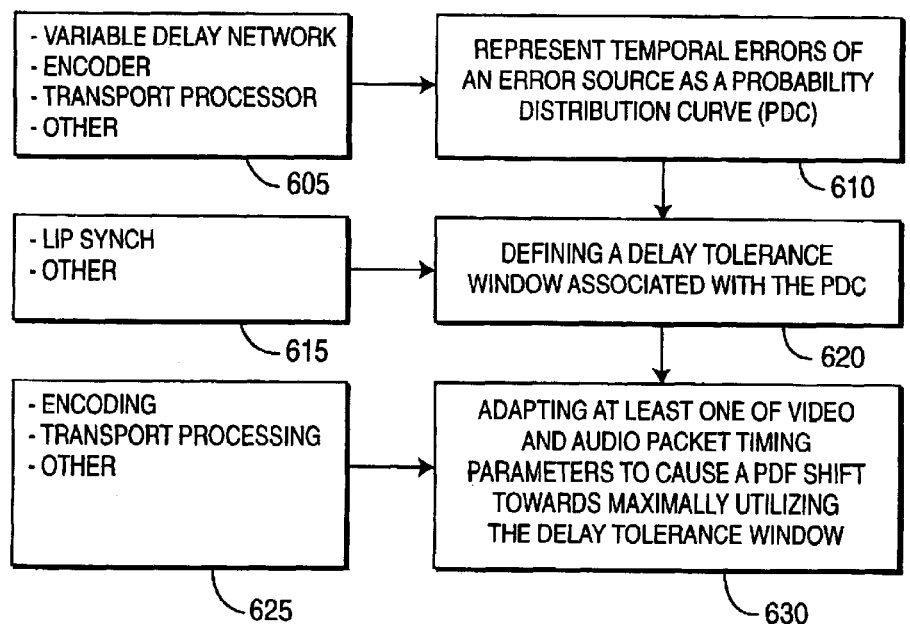
FIG. 6 depicts a method for processing audio and/or video packets according to the invention.

FIG. 6 depicts a method for processing audio and/or video packets according to the invention. Specifically, FIG. 6 depicts a method for adapting corresponding video and/or audio frame or access unit packets such that lip sync errors and, more particularly, leading audio type lip sync errors are minimized. Within the context of the method of FIG. 6, lip sync errors are induced by, per box 605, an error source comprising one or more of a variable delay network, an encoder, a transport processor or other error source.

At step 610, the temporal errors likely to be produced by an error source are represented as a probability density function (pdf). For example, as described above with respect to FIG. 5, a pdf associated with temporal errors likely to be induced by a variable delay network are shown. This pdf comprises, illustratively, a random number distribution having a Gaussian shape (may or may not centered at zero), where zero represents no lip sync error (i.e., temporal alignment of video and audio data).

At step 620, an error tolerance window associated with the pdf is defined. As noted in box 615, the error tolerance window may be defined with respect to lip sync error or other errors. As noted in FIG. 5, a delay tolerance window associated with lip sync errors is defined as, illustratively, those delays between −20 milliseconds and +40 milliseconds. That is, an asymmetrical audio delay tolerance value (with respect to the zero time point) is provided with audio access units leading corresponding video access units by up to 20 milliseconds or lagging corresponding video packets by up to 40 milliseconds is deemed tolerable. Other delay tolerance windows may be defined, depending upon the factors associated with a communications system utilizing the present invention.

At step 630, the method adapts timing parameters such as timestamps associated with at least one of the video and audio frames forming a content stream. Optionally, one or both of non-compressed audio and video streams are delayed prior to encoding. This adaptation is performed in a manner tending to cause a shift in the pdf associated with the error source from an initial position (e.g., centered about zero) towards a position maximally utilizing the delay tolerance window. It is noted in box 625 that such adaptation may occur during an encoding process, a transport process or other process. Referring back to FIG. 5, an appropriate pdf shift is shown as one that increases the amount of area under the probability distribution curve that is within the bounds established by the delay tolerance window.

Figure 7:
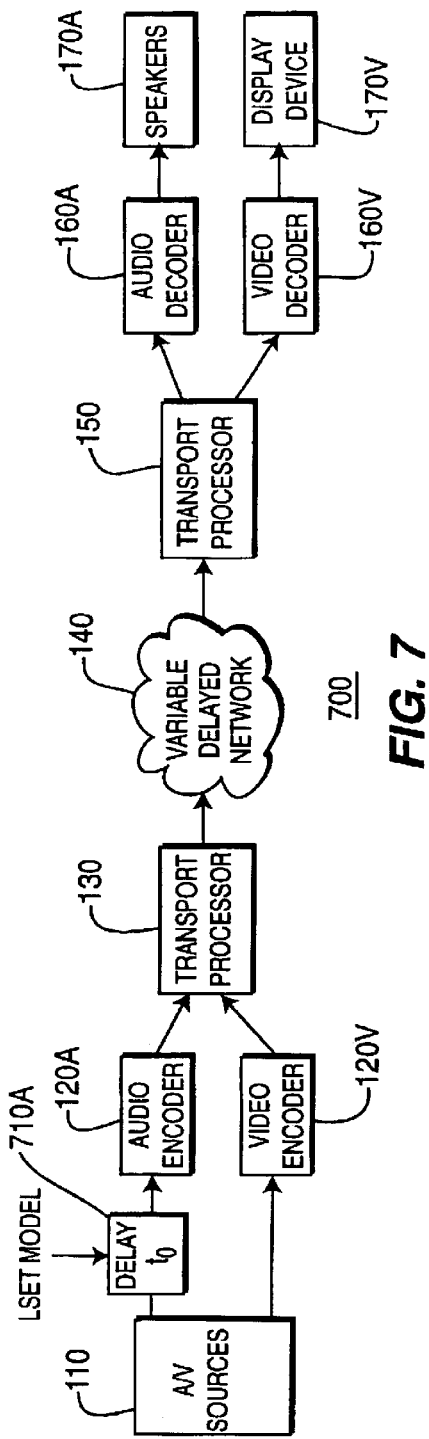
FIG. 7 depicts a high-level block diagram of a communication system according to an alternate embodiment of the invention.

FIG. 7 depicts a high-level block diagram of a communication system according to an alternate embodiment of the invention. Specifically, the communication system 700 of FIG. 7 is substantially the same as the communication system 100 of FIG. 1. The main difference is that a delay element 710A is used to delay the initial audio stream A prior to the encoding of this audio stream by the audio encoder 120A. The delay element 710A imparts a delay of to $t_0$ the audio stream to shift a corresponding pdf in accordance with the lip sync error tolerance (LSET) model discussed above. It is noted that the communication system 700 of FIG. 7 may be modified to include a corresponding video delay element 710V (not shown) for delaying the video source signal V prior to encoding by the video encoder 120V. One or both of the audio 710A and video 710V delay elements may be utilized.

In this embodiment of the invention, where the error tolerance window 410 as shown in FIG. 5 is utilized, each, illustratively, audio frame or access unit is delayed by approximately $t_0$ milliseconds with respect to each video frame prior to encoding. By shifting each audio frame back in time by $t_0$ milliseconds, the pdf associated with the errors induced by the variable delay network is shifted in the manner described above with respect to FIG. 5. That is, the pdf is shifted forward or backward, depending on the sign of $t_0$, in time from a tendency to have a leading audio packet lip sync error to a tendency for no lip sync error or a lagging audio packet lip sync error (which is less objectionable than a leading audio packet lip sync error). Thus, the probability is increased that any audio packet delay will remain within the error tolerance limits set by the error tolerance window 410.

In one embodiment of the invention where a symmetrical Gaussian pdf such as shown in FIG. 2, is assumed, the timestamps of the audio or video frames are modified to minimize the timing mismatch. For a constant bit rate audio encoder, the video timestamp is optionally modified in a manner tending to increase the probability of the timing mismatch remaining within the LSET on the decoder side. In this embodiment, illustratively, the video timestamps are rounded off to the lower tens of milliseconds, such as indicated by equation 6, as follows (where $t_e^v$ and $\hat{t}_e^v$ are original and rounded off timestamps for a video frame in millisecond):

$$\hat{t}_e^v = t_e^v - (t_e^v \bmod 10) \qquad \text{(eq. 6)}$$

The above technique introduces a uniformly distributed delay in audio packets in the range from 0 to 9 millisecond. Other ranges may be selected (e.g., mod 15, mod 20, etc.), and audio packets may also be processed in this manner.

In the previously described embodiments, the LSE pdf's are known and presumed to be somewhat stable. As a result, a predetermined time shift is performed on all audio (or video) access units. In a more advanced embodiment where the LSE pdf may be not known or is not stable, the LSE pdf is monitored and estimated, and the time shift is not predetermined.

Figure 8:
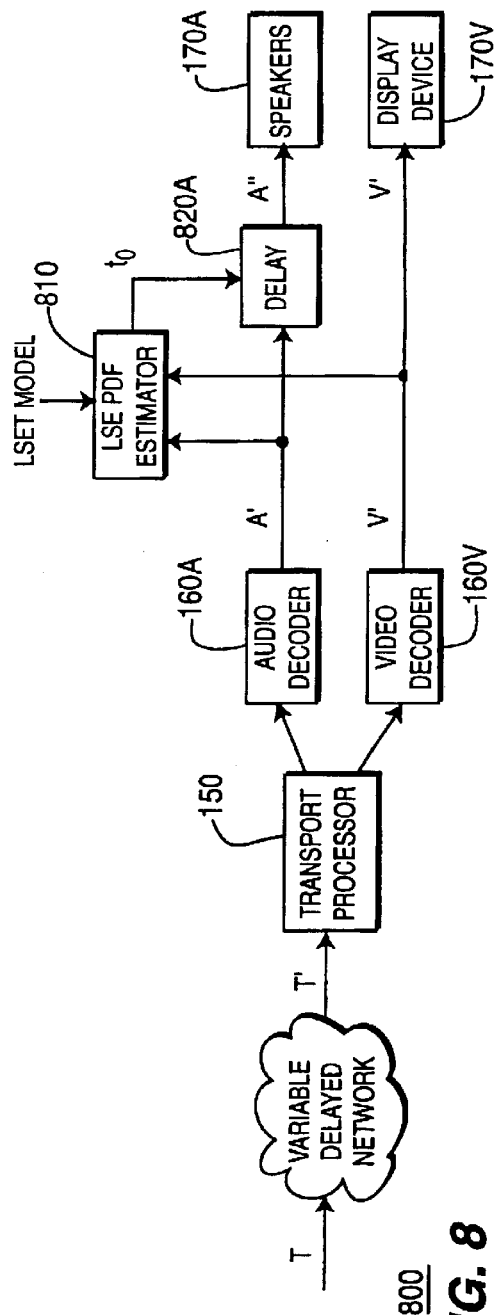
FIG. 8 depicts a high-level block diagram of an embodiment of the invention in which a pdf estimator is implemented at the receiver end.

FIG. 8 depicts the LSE in the embodiment where a pdf estimator is implemented at the receiver side. Specifically, receiver-side apparatus such as depicted above in FIGS. 1 and 7 is modified to include an LSE pdf estimator 810 and an audio delay element 820A. While not shown, a video delay element 820V may also be utilized. The LSE pdf estimator 810 receives the decoded audio A' and video V' signals and, in response to LSET model information, produces a delay indicative signal to. In the embodiment of FIG. 8, the delay indicative signal to is processed by the audio delay element 820A to impart a corresponding amount of delay to the decoded audio stream A', thereby producing a delayed audio stream A". The estimator 810 constantly collects presentation time stamps of audio and video access units. Each LSE e is calculated using equation 1. All the LSEs are used to form the pdf of the LSE. By using the LSET model, the optimal time shift $t_0$ can be derived by solving equation 4 for the time shift $t_0$. Delay in either the audio frame ($t_0 > 0$) or video frame ($t_0 < 0$) is added to shift the LSE pdf.

In one embodiment, the determined optimal timeshift is propagated from the receiver to the encoder such that at least one of the audio and video streams to be encoded and transmitted is delayed prior to encoding, prior to transport processing and/or prior to transport to the receiver.

Although various embodiments which incorporate the teachings of the present invention have been shown and described in detail herein, those skilled in the art can readily devise many other varied embodiments that still incorporate these teachings.

What is claimed is:

1. A method for video and audio stream synchronization comprising the steps of:

receiving video access units and corresponding audio access units, said video and corresponding audio access units representing audio-visual information tending to exhibit an audio-visual temporal synchronization error described by a first probability distribution function (pdf); and temporally delaying one of said received audio and video access units by a delay amount, non-delayed and corresponding delayed access units representing audiovisual information tending to exhibit an audio-visual temporal synchronization error described by a second pdf, said second pdf utilizing a greater portion of an asymmetrical sync tolerance window than said first pdf.

2. The method of claim 1, wherein:

said first pdf has associated with it a negative temporal mismatch value and a positive temporal mismatch value, said temporal mismatch values having different absolute values; and said delay amount being selected to reduce the difference in absolute value of said negative temporal mismatch value and the absolute value of the positive temporal mismatch values.

3. The method of claim 2, wherein said negative temporal mismatch value is approximately 20 milliseconds said positive temporal mismatch value is approximately 40 milliseconds, and said audio access units are delayed by approximately 10 milliseconds.

4. The method of claim 1 wherein said delay amount is imparted prior to an encoding of audio and video streams that produces said audio and video access units.

5. The method of claim 1, wherein said delay amount is imparted during an encoding of audio and video streams that produces said audio and video access units.

6. The method of claim 1, further comprising:

adapting said delay amount in response to changes in said first pdf.

7. The method of claim 6, wherein said changes are determined by examining presentation timestamps of audio and video access units at a receiver.

8. The method of claim 1, further comprising:

adapting said delay amount in response to changes in an audio-visual temporal synchronization error inducing source.

9. The method of claim 8, wherein said audio-visual temporal synchronization error inducing source comprises a variable delay network.

10. A method for producing encoded video and corresponding audio streams, comprising the steps of:

encoding temporally corresponding video and audio information to produce encoded video and audio streams comprising respective video and audio access units; and temporally delaying one of said encoded video and audio streams by a delay amount corresponding to an asymmetrical sync error tolerance model;

said error tolerance model defining a synchronization tolerance window; and said temporal delay causing a probability distribution function (pdf) describing a synchronization error between said audio signal and corresponding video streams to be shifted towards a more favorable correspondence with said synchronization tolerance window.

11. The method of claim 10, wherein said step of temporally delaying comprises delaying one of said video and audio streams prior to said encoding.

12. The method of claim 10, wherein each of said encoded video and audio streams comprise a plurality of said respective video and audio access units; and said step of temporally delaying comprises adapting timestamps associated with at least one of said video and audio access units by said delay amount.

13. The method of claim 10, wherein timestamps associated with one of said encoded video and audio streams are rounded off by a predetermined amount.

14. The method of claim 13, wherein said video stream timestamps are estimated by reducing each video stream timestamp by the respective video stream timestamp as processed by a modulo operation.

15. The method of claim 10, wherein the amount of temporal delay is adapted in response to changes in an audio-visual temporal synchronization error producing source.

16. An apparatus, comprising:

a delay element, for imparting a temporal delay to at least one of an audio signal and a corresponding video signal in response to an asymmetrical error tolerance model; and an encoder, for encoding the audio and video signals to produce encoded audio and video streams;

said error tolerance model defining a synchronization tolerance window; and said temporal delay causing a probability distribution function (pdf) describing a synchronization error between said audio signal and corresponding video signal to be shifted towards a more favorable correspondence with said synchronization tolerance window, wherein said synchronization tolerance window has associated with it a negative temporal mismatch value and a positive temporal mismatch value, said temporal mismatch values having different absolute values, said pdf having respective negative and positive temporal mismatch values that are shifted towards alignment with said synchronization tolerance window temporal mismatch values.

17. A computer readable medium having computer executable instructions for performing steps comprising:

receiving video access units and corresponding audio access units, said video and corresponding audio access units representing audiovisual information tending to exhibit a synchronization error described by a first probability distribution function (pdf); and temporally delaying one of said received audio and video access units by a delay amount, non-delayed and corresponding delayed access units representing audiovisual information tending to exhibit a synchronization error described by a second pdf, said second pdf utilizing a greater portion of an asymmetrical synchronization tolerance window than said first pdf.

18. The computer readable medium of claim 17, wherein said steps further comprise:

imparting said delay amount prior to an encoding of audio and video streams that produces said audio and video access units.

* * * * *